United States Patent [19]
Kaneko et al.

[11] Patent Number: 5,260,817
[45] Date of Patent: Nov. 9, 1993

[54] LIQUID CRYSTAL OPTICAL DEVICE COMPRISING A LIQUID CRYSTAL PIXEL AND A PARALLEL CIRCUIT FOR PROVIDING A GRADATION OF DISPLAY

[75] Inventors: Shuzo Kaneko, Yokohama; Ryoji Fujiwara, Chigasaki; Tomoko Maruyama, Isehara; Murakami Tomoko, Atsugi, all of Japan

[73] Assignee: Canon Kabushiki Kaisha, Tokyo, Japan

[21] Appl. No.: 857,510

[22] Filed: Mar. 25, 1992

[30] Foreign Application Priority Data

Mar. 27, 1991 [JP] Japan .................. 3-063199
Mar. 27, 1991 [JP] Japan .................. 3-063204

[51] Int. Cl.⁵ .............................. G02F 1/133
[52] U.S. Cl. .............................. 359/56; 359/75; 359/85
[58] Field of Search ............ 359/56, 84, 85, 99, 359/100, 75

[56] References Cited

U.S. PATENT DOCUMENTS

| | | | |
|---|---|---|---|
| 3,957,349 | 5/1976 | Nelson | 359/85 |
| 4,205,311 | 5/1980 | Kutaragi | 359/85 |
| 4,367,924 | 1/1983 | Clark et al. | 359/56 |
| 4,440,473 | 4/1984 | Sekimoto | 359/84 |
| 4,738,515 | 4/1988 | Okada et al. | 359/56 |
| 4,840,462 | 6/1989 | Hartmann | 359/56 |
| 4,976,515 | 12/1990 | Hartmann | 359/56 |

OTHER PUBLICATIONS

Hartmann, Proceedings SID (1989) vol. 30, No. 2, 99:103.
Clark et al., App. Phys. Lett. (1980) vol. 36, No. 11, 899:901.
Solid State Physics (1981) vol. 16, No. 3, 141;151.
Mayer et al., Phys. Abs. (1975) vol. 36, No. 3, 69:71.

*Primary Examiner*—William L. Sikes
*Assistant Examiner*—Huy K. Mai
*Attorney, Agent, or Firm*—Fitzpatrick, Cella, Harper & Scinto

[57] ABSTRACT

A liquid crystal optical device has a ferroelectric liquid crystal layer held in a gap defined by at least a pair of electrodes, wherein the crystal pixel has a time constant. The liquid crystal device also has a parallel circuit having a time constant greater than the time constant of the liquid crystal pixel and less than a field period for giving a gradation change to the pixel by repeated application of a gradation signal.

6 Claims, 11 Drawing Sheets

LIQUID CRYSTAL OPTICAL DEVICE COMPRISING A LIQUID CRYSTAL PIXEL AND A PARALLEL CIRCUIT FOR PROVIDING A GRADATION OF DISPLAY

BACKGROUND OF THE INVENTION

1. Field of the Invention

The present invention relates to a liquid crystal optical device which produces an optical response by the effect of spontaneous polarization of this device.

2. Related Background Art

Ferroelectric liquid crystals (FLC), which are liquid crystals having spontaneous polarization, are being noticed because of their high response speed and excellent memory effect, and are being developed vigorously as materials for use in display devices, light valves and so forth. In fact, various devices are available which utilize the superior characteristics of ferroelectric liquid crystals, such as a light shutter array, highly fine display device by a simple matrix drive, and light valve combined with a photo-conductor and exhibiting high recording density. Furthermore, ferroelectric liquid crystal, driven by an active matrix drive system using thin-film transistor (TFT), is used in display devices which displays dynamic images. These characteristics of ferroelectric liquid crystals are detailed in, for example, U.S. Pat. No 4,840,462 and Proceeding of the SID, Vol. 30/2, 1989 "Ferroelectric Liquid Crystal Video Display".

A problem, however, has been encountered in that liquid crystal optical devices using ferroelectric liquid crystals cannot provide good gradation of display.

SUMMARY OF THE INVENTION

Accordingly, an object of the present invention is to provide a liquid crystal optical device which is capable of displaying images with a high degree of gradation.

According to one aspect of the present invention, there is provided a liquid crystal optical device in which a ferroelectric liquid crystal layer is held in a gap between at least a pair of electrodes so as to form a liquid crystal pixel, so that the liquid pixel is driven to exhibit gradation as an external voltage is applied between the electrodes in accordance with a gradation signal, the liquid crystal optical device comprising: a parallel circuit composed of a capacitance and a resistance, the parallel circuit being connected in series to the gap between the electrode.

According to another aspect of the present invention, there is provided a liquid crystal optical device in which a ferroelectric liquid crystal layer and orientation layers for orienting the liquid crystal is held in a gap between at least a pair of electrodes so as to form a liquid crystal pixel, so that the liquid pixel is driven to exhibit gradation as an external voltage is applied between the electrodes in accordance with a gradation signal, wherein the following condition is met:

$$C_{LC}R_{LC} \leq t_{reset} \leq C_A R_A < t_{field}$$

wherein $C_{LC}R_{LC}$ represents the time constant of the liquid crystal layer, $C_A R_A$ represents the time constant of the orientation layers, $t_{field}$ represents the period of the field for imparting a gradation change to the pixel by repeated application of the gradation signal, and $t_{reset}$ represents the shortest period of application of voltage for causing an optical change of the pixel within the range which provides the maximum response inversion of the pixel.

BRIEF DESCRIPTION OF THE INVENTION

DESCRIPTION OF THE PREFERRED EMBODIMENTS

Various experiments conducted by the present inventors and other parties have revealed the following problems in regard to driving of ferroelectric liquid crystals.

One of the problems is that the response characteristic of ferroelectric liquid crystal is impaired when a D.C. voltage component is applied to the ferroelectric liquid crystal continuously for a long time.

One of the causes of such problem is considered to reside in the the D.C. component localizes the ions inside the liquid crystal, resulting in a formation of an electric field.

Namely, ferroelectric liquid crystals, due to its spontaneous polarization, causes the internal ions to be localized in response to the spontaneous polarization. The localized internal ions form an electric field which make any desired halftone unstable, and produces a hysteresis in the response to external voltage applied to the ferroelectric liquid crystal.

Figure 11:
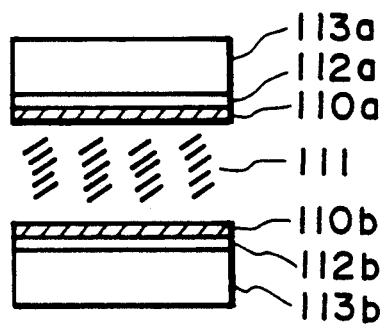
FIG. 11 is a schematic illustration of a liquid crystal cell.
Figure 12:
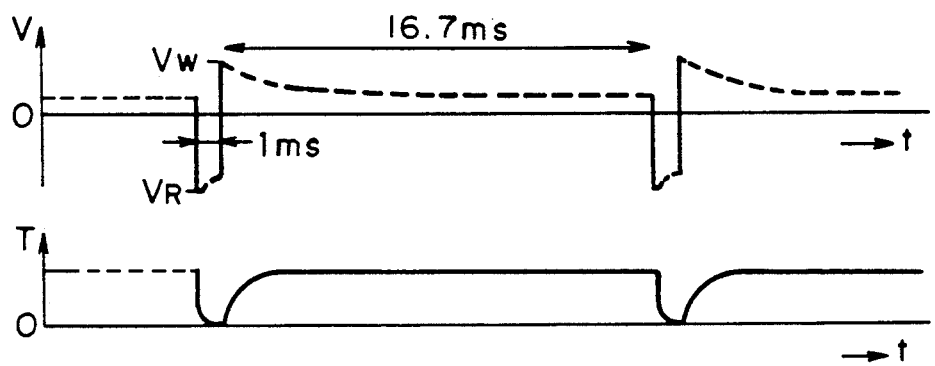
FIG. 12 is a graph showing the timing of application of a pulse to a ferroelectric liquid crystal.
Figure 13:
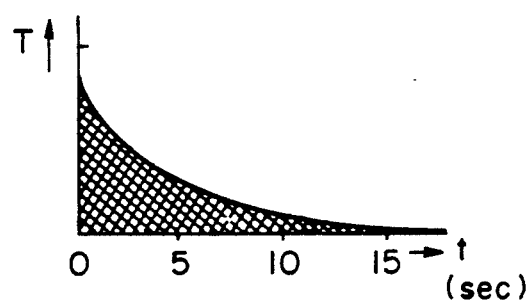
FIG. 13 is an illustration of a change in the liquid crystal caused by application of a pulse.

For instance, it is assumed that reset pulses and writing pulses are continuously applied as shown in FIG. 12 to a ferroelectric liquid crystal cell of the type shown in FIG. 11, at a driving frequency on the order of television rate up to 60 Hz. In such a case, a phenomenon as shown in FIG. 13 is caused by the D.C. component of the pulses. It will be seen that the transparency progressively decreases as a result of repeated application of pulses. This phenomenon will be briefly explained with reference to FIG. 14. It seems that, when the waveform shown in FIG. 12 is used, geometrically plus (+) D.C. component is applied excessively.

Figure 14:
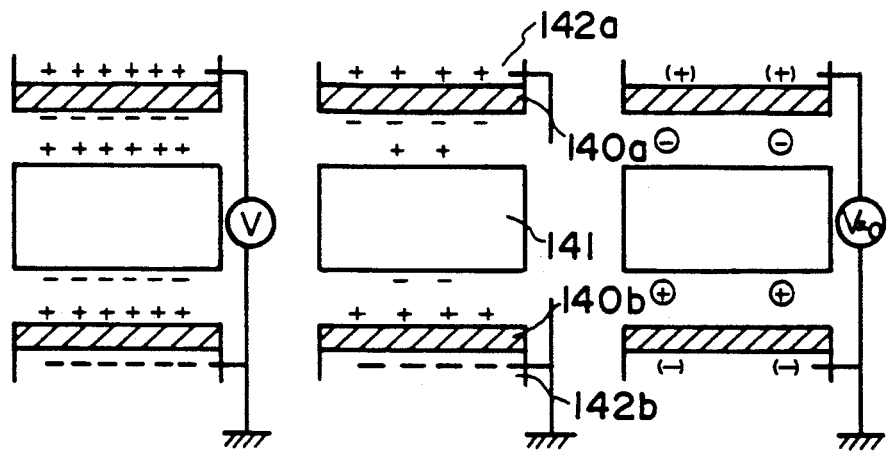
FIG. 14 is a schematic illustration of an effect produced by the D. C. component on a liquid crystal.

FIG. 14 illustrates the effect produced by the D.C. component on the liquid crystal. As a result of application of a plus D.C. component, accumulation of charges (+: 142a; 142b) takes place between the insulating layer portion 140a(140b) and the liquid crystal 141, and the resultant charge component produces a minus (−) divided potential of the liquid crystal, which progressively makes it difficult to write "white".

Figure 15:
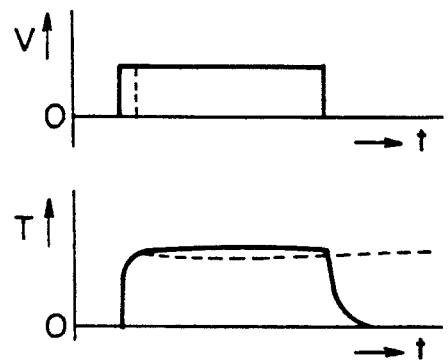
FIG. 15 is a graph showing voltage and transparency in relation to time.

FIG. 15 illustrates a phenomenon which is more easy to understand.

The cell shown in FIG. 11 has substrates 113a, 113b, electrodes 112a, 112b, insulating films 110a, 110b; and ferroelectric liquid crystal 111.

A graph shown in the lower part of FIG. 15 shows an optical response exhibited by the cell of FIG. 11 when the cell is grounded when varying time has passed after application of a plus step voltage. The cell shown in FIG. 11 has a memory characteristic so that it retains transparency as shown by broken line after writing of "white" when the period of application of the voltage is short. However, when the period of application of the pulse is long, the state of the cell is changed to "black" due to reverse voltage caused by the accumulation of charges.

Figure 16:
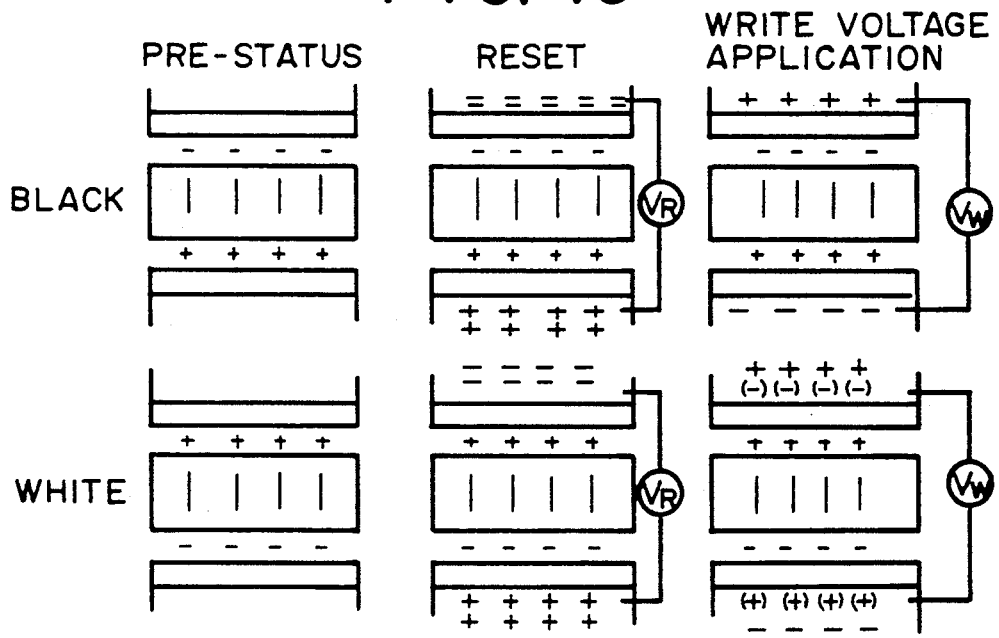
FIG. 16 is a schematic illustration of an effect produced by application of a pulse to a liquid crystal.

A qualitative explanation will be given of the aforesaid hysteresis which is considered to be attributed to the effect of spontaneous polarization. The upper portion of FIG. 16 illustrates the direction of spontaneous polarization and the polarity of charged induced by the spontaneous polarization when the mode is "black" stable mode, while the lower stage of the same Figure shows the direction of spontaneous polarization and the polarity of charged induced by the spontaneous polarization when the mode is "white" stable mode.

Even when the writing voltage $V_A$ is the same, the voltage applied to the liquid crystal portion varies depending on whether the former state was "black" or "white", due to difference in the polarity of the induced charges. Namely, greater voltage is applied to the liquid crystal when the former state was "white". The aforesaid hysteresis is considered to be attributable to this fact.

In order to avert from such electrical unstable state, it would be possible to eliminate the above-mentioned insulating layer. Such a measure, however, causes other problems such as insufficiency of degree of uniformity of orientation.

Another problem encountered with ferroelectric liquid crystal is that, since the thickness of the liquid crystal layer is as small as 1 to 2 μm, the whole device maybe broken down due to short-circuit between the upper and lower electrodes, when the above-mentioned insulating layer is removed.

In view of the problems described above, the present inventors have made an intense study to obtain a ferroelectric liquid crystal optical device which is capable of stably creating halftone in response to picture input even when the frequency is as high as television rate, thus accomplishing the present invention.

The invention will be described in more detail with reference to the drawings.

Figure 1:
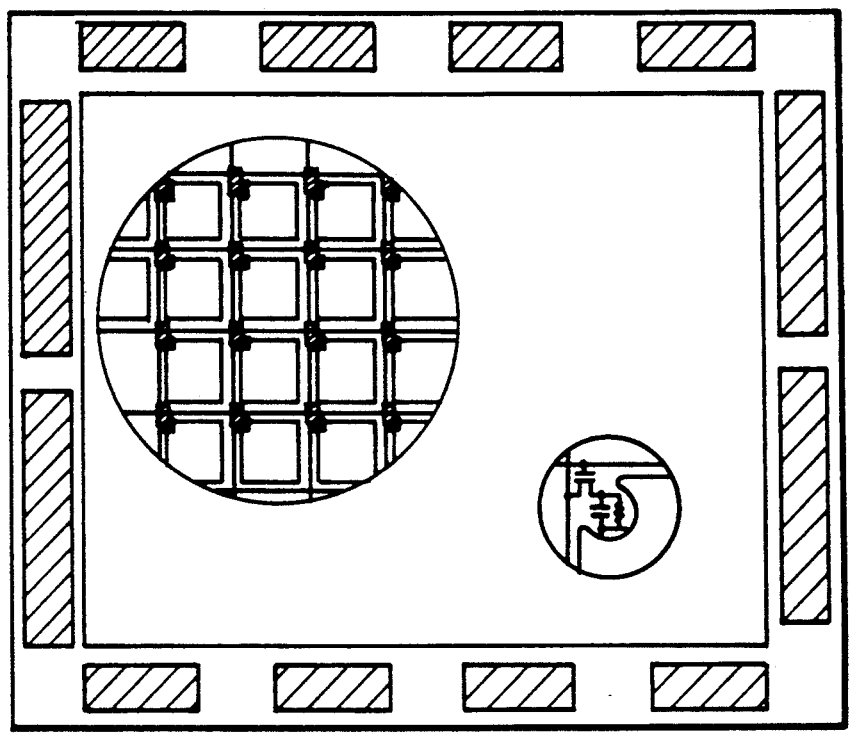
FIG. 1 is a schematic illustration of an embodiment of the liquid crystal optical device in accordance with the present invention, constructed as an active matrix device.

FIG. 1 is a schematic illustration of an embodiment of the ferroelectric liquid crystal optical device of the present invention, constructed as an active matrix device.

In this active matrix device, a plurality of liquid crystal pixels each having ITO electrodes are arranged in the form of a matrix. A switching transistor such as a TFT (thin film transistor) or another transistor formed by an ordinary IC process is connected to each pixel. A parallel connection of a capacitance $C_R$ and a resistor $R_R$, which also are formed by IC processes, is connected in series to each pixel.

Figure 2:
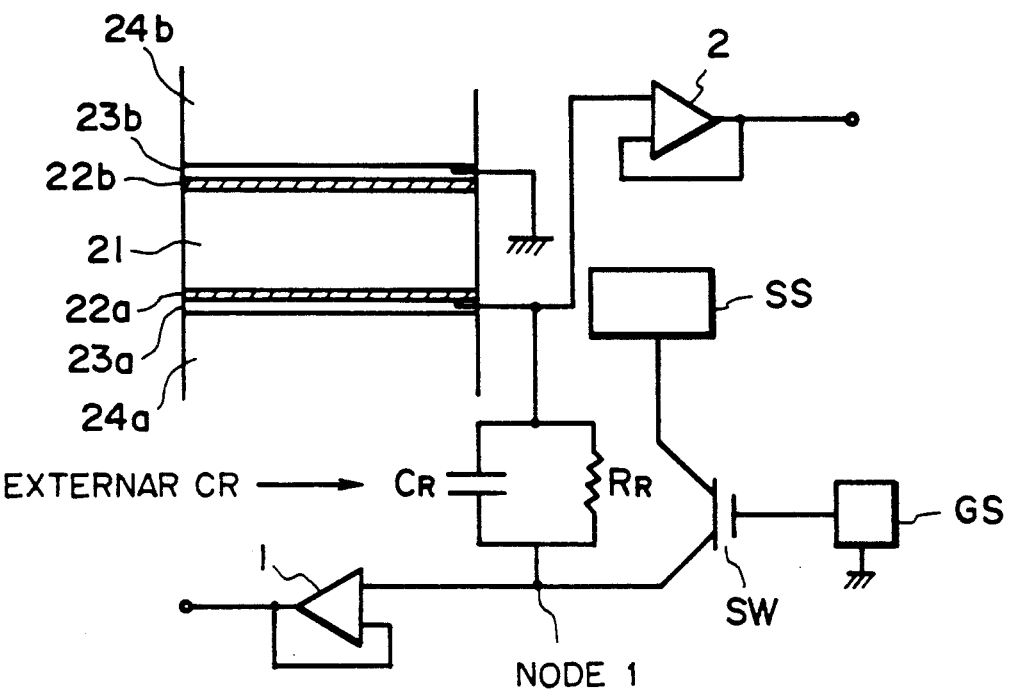
FIG. 2 is a schematic illustration explanatory of the effect produced by the present invention.

FIG. 2 schematically illustrates the effect of the invention on the liquid crystal pixel.

In FIG. 2, numerals 24a, 24b denote substrates made of a glass, quartz or the like, 23a, 23b denote transparent electrodes made of ITO, $SnO_2$ or the like or electrodes made of Al, Au or the like, and 22a, 22b denote orientation layers which are provided for enhancing orientation of the liquid crystal. According to the invention, the liquid crystal 21 may be oriented by direct rubbing of the electrodes, although such rubbing is not essential.

Referring to FIG. 2, numeral 21 designates a ferroelectric liquid crystal layer. The liquid crystal layer suitably used in the invention is preferably doped with a suitable dopant so as to reduce its resistance.

The auxiliary CR (external CR) used in the invention serves to prevent any excess voltage or current from applying directly to the liquid crystal device, thus avoiding short-circuiting.

According to the invention, the following advantages are further produced.

The first advantage is that the divided potential, which is materially acting on the ferroelectric liquid crystal as a result of external application of the gradation voltage, is stably applied in response to the gradation signal voltage. The second advantage is that any influence of fluctuation of the divided potential on the ferroelectric liquid crystal, which may be attributed to spontaneous polarization of the ferroelectric liquid crystal, is eliminated, while ensuring stable driving with gradation control.

Figure 3:
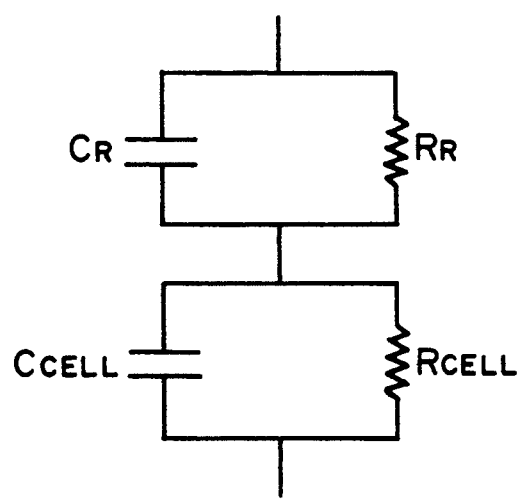
FIG. 3 is an illustration of an equivalent circuit.

The advantage of the device in accordance with the invention is remarkable particularly when an open-mode driving is effected by an active switching circuit such as that employing transistors, as shown in FIGS. 1 and 2. The first advantage described above will be explained in detail with reference to an equivalent circuit shown in FIG. 3, as well as to FIGS. 2 and 4.

In an optimum form of the device in accordance with the present invention, the time constant of the externally mounted $C_R R_R$ and the time constant $C_{cell} R_{cell}$ of the capacitance component $C_{cell}$ and the resistance component $R_{cell}$ of the pixel are determined to meet the condition of $C_R R_R > C_{cell} R_{cell}$, thus enhancing the short-circuit prevention effect. In addition, the time constant $C_R R_R$ is determined to be smaller than the field period $t_{field}$ shown in FIG. 4. It is to be noted, however, the invention does not exclude such a condition as expressed by $C_R R_R \leq C_{cell} R_{cell}$.

Figure 4:
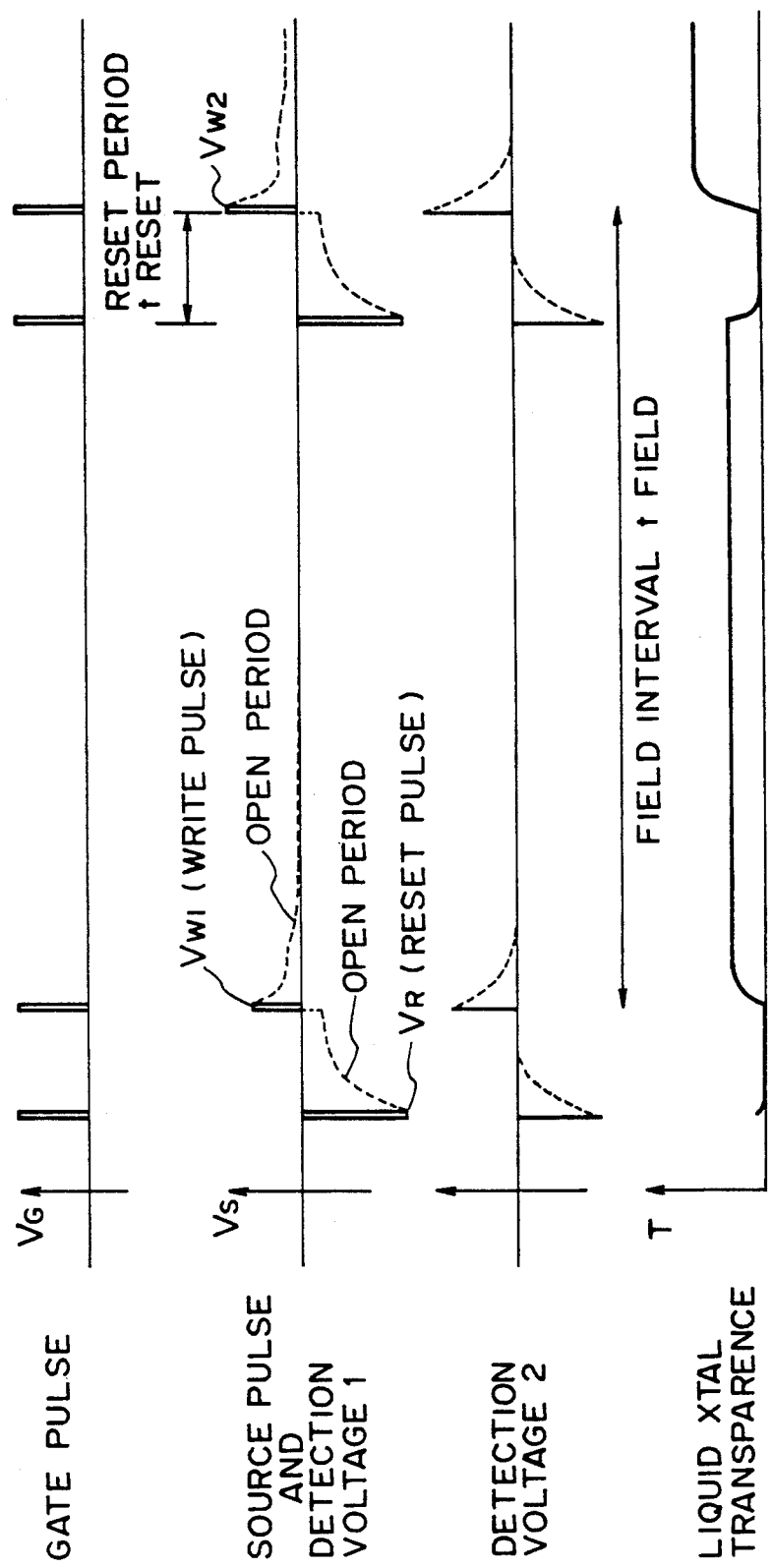
FIG. 4 is a graph showing the correlation between the field period and voltage/transparency.

A description will now be given of an operation which is effected by a driving circuit schematically shown in FIG. 2 or a case where an operation as shown in FIG. 4 is triggered by voltage detection circuits 1, 2. The above-mentioned time constant $C_R R_R$ is determined such that the voltage applied to the node 1 shown in FIG. 2, i.e., the detection voltage detected by the detecting circuit 1 is attenuated almost completely before the next reset pulse is applied.

Figure 5:
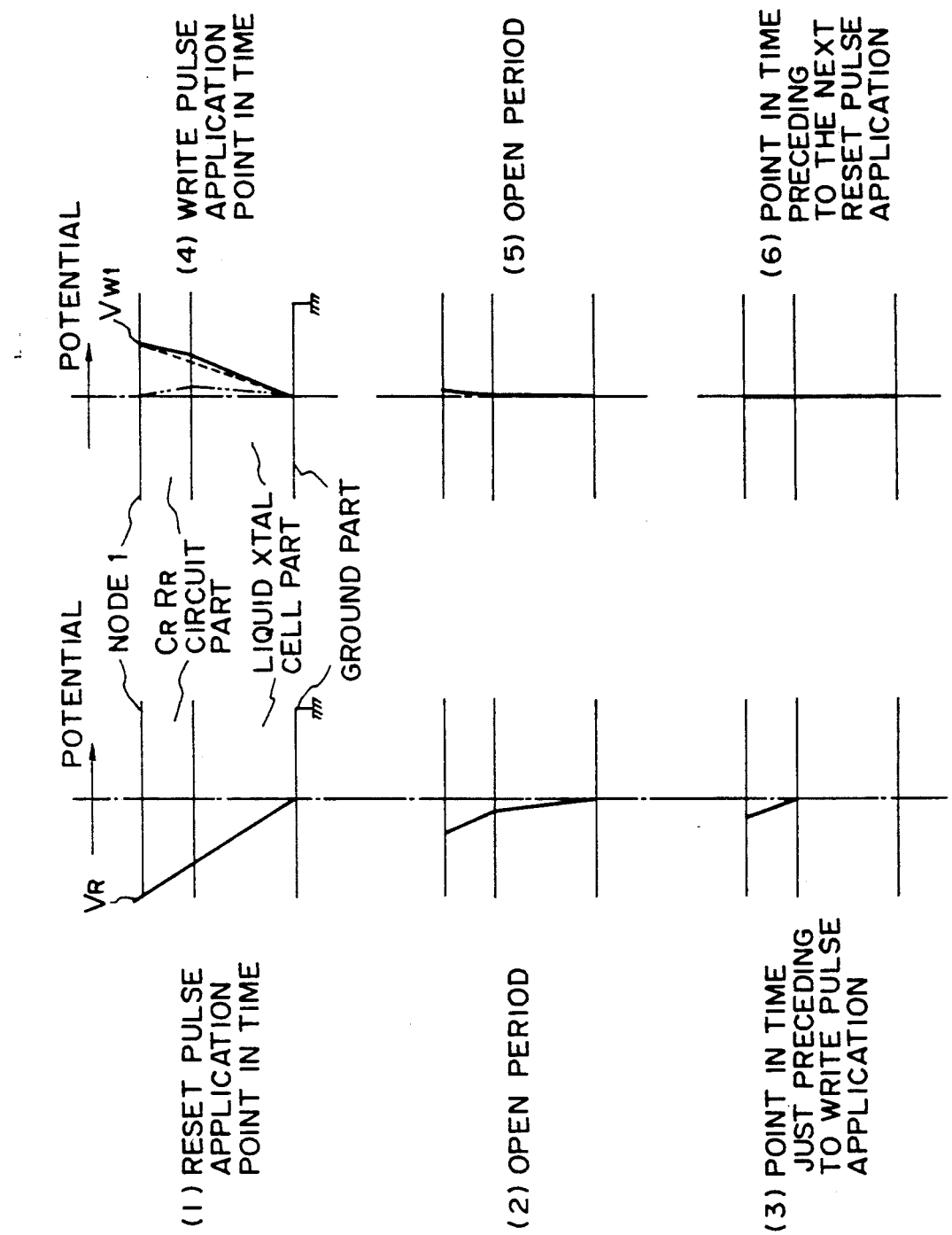
FIG. 5 is a graph showing the relationship between the pulse application and electrical potential.

FIG. 5 shows, in terms of the potential distribution between the node 1 and the ground shown in FIG. 2, the effect which is produced by an adjustment of the time constant of the external $C_R R_R$. (1) When a reset pulse $V_R$ is applied, a linear potential state is obtained in accordance with the reset voltage. (2) Then, as the open state is established, the potentials of the $C_R R_R$ portion and the liquid crystal pixel cell are attenuated at their own time constants. (3) Consequently, immediately before the application of the writing pulse $VW_1$, a potential difference state is obtained such that the potential of the $C_R R_R$ portion is greater than the cell portion, due to the aforesaid condition of $C_R R_R > C_{cell} R_{cell}$, whereby a folded potential state is obtained as illustrated. (4) A write pulse is then applied. In this case, the potential difference remaining mainly in the $C_R R_R$ portion acts as illustrated by two-dot-and-dash line, which is superposed to the external field indicated by broken line, whereby a deflected potential state is obtained again. (5) Then, as an open state is established, the potentials are attenuated at the respective time constants. (6) According to the present invention, the condition of $C_R R_R < t_{field}$ is met as explained before, so that the region between the node 1 and the ground is reduced to zero potential substantially linearly. It is therefore possible to eliminate any hysteresis of potential for the next field, regardless of the type of the write pulse, thus suppressing the undesirable variation of the transparency, i.e., unstable operation characteristic which has been experienced with the known devices.

Furthermore, in the optical device of the present invention, a further stabilization of gradation driving is realized. To this end, the time constant $C_{cell}R_{cell}$ of the cell portion (or time constant $C_{LC}R_{LC}$ of the liquid crystal layer in the cell when the cell has Orientation layers) is determined to be smaller than the reset period $t_{reset}$ which is shown in FIG. 4. Namely, any hysteresis or other factors affecting stability, caused by fluctuation of charges including internal ions due to spontaneous polarization, is avoided, thus attaining the second advantage described above. This effect will be described with reference to FIG. 6.

Figure 6:
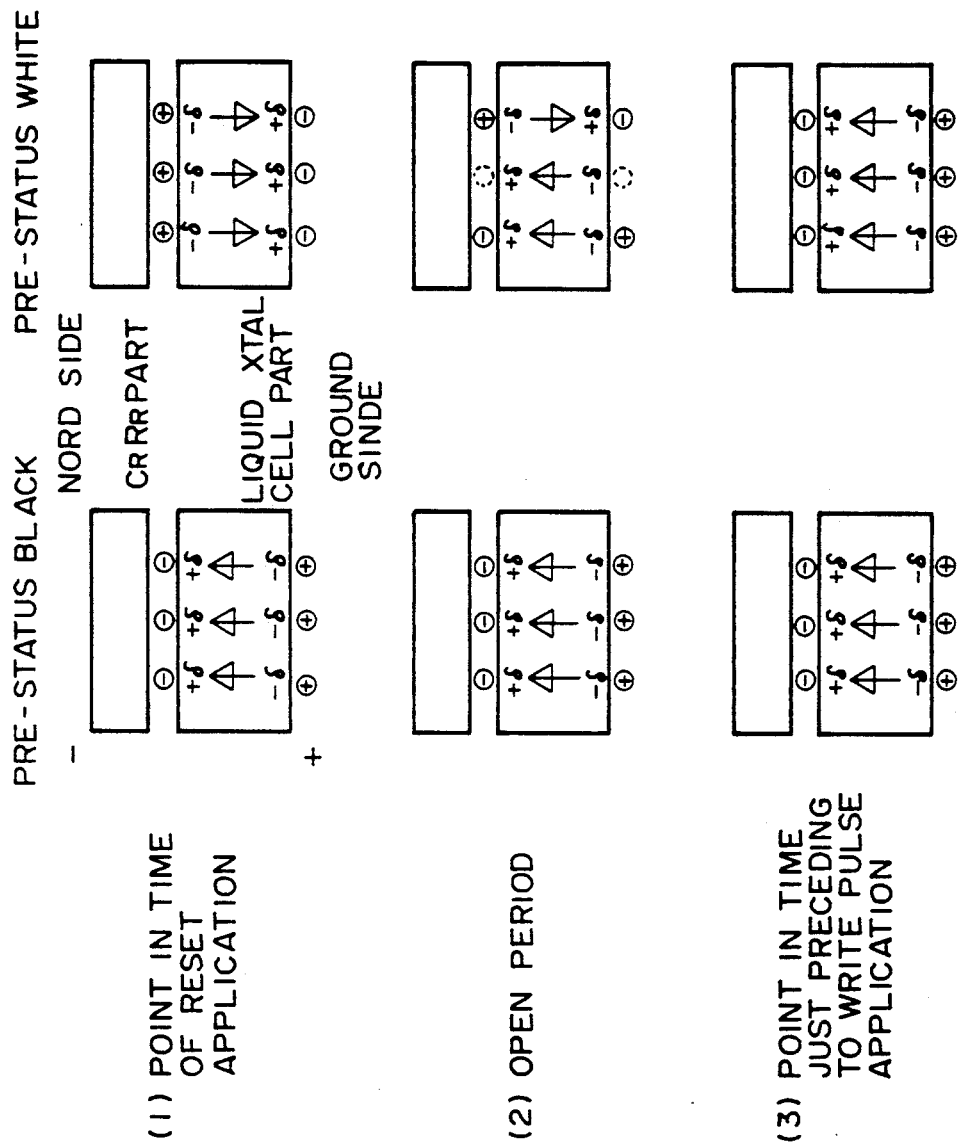
FIG. 6 is a schematic illustration of the states of a liquid crystal through application of a reset pulse.

The left column in FIG. 6 illustrates the states of liquid crystal as observed when the state immediately before application of the reset pulse is "black"

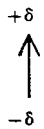

whereas, in the right column, states of liquid crystal as obtained when the state immediately before the application of the reset pulse is white.

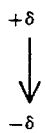

In the case where the state of the liquid crystal immediately before the application of the reset pulse is "black", the polarity of charges (ions) which are on the upper side of the layer in response to spontaneous polarization is (−) in each of the states (1) when reset pulse is applied, (2) in open state after application of the reset pulse and (3) immediately before application of a write pulse. In the state immediately before the application of the write pulse, the divided potential applied to the liquid crystal caused by spontaneous polarization is substantially zero.

Conversely, in the case where the state of the liquid crystal is "white" before the application of the reset pulse, the following conditions are obtained: (1) during application of the reset pulse, no change of direction is caused within the period of the pulse width, and (2) the liquid crystal is reset to "black" in the subsequent open period. In this case, since in the invention the time constant of the liquid crystal is smaller than the reset period $t_{reset}$ at the greatest, relaxation of the charges (or ions) is commenced without delay after the resetting. Consequently, (3) immediately before the application of the write pulse, charges (or ions) of (−) polarity appear on the upper side of the liquid crystal forming a couple with the spontaneous polarization, as is the aforementioned case where the liquid crystal state was black before the resetting. The quantity of these charges is such as to substantially nullify the divided potential of the crystal. Consequently, the hysteresis of the potential is erased before the next write pulse is applied, so that information can stably be written with good gradation control in response to a gradation signal.

The above described advantages are obtainable also when the liquid crystal is provided with orientation layers, provided that the time constant $C_A R_A$ of the orientation layer is determined so as not to exceed the aforesaid period $t_{field}$.

Practical examples of the present invention will be described hereinunder. A film of ITO (indium tin oxide) is formed on a glass substrate to a thickness of about 1500 Å by sputtering, thus obtaining a transparent electrode. On the other hand, a dispersion liquid was formed by dispersing, in a polysiloxane type polymer liquid, conductive micro-particles of tin-oxide antimony ($SnO_2$. Sb) of a mean particle size not greater than 50 Å. This suspension liquid was applied to the above-described electrode by means of a spinner for a period of 30 seconds at a spinner rotation speed of 1000 to 3000 r.p.m. Subsequently, a heat treatment was conducted at 150° C. for 60 minutes, whereby a film of 500 to 1500 Å thick was obtained. This film was then rubbed, whereby an orientation film was formed. Subsequently, a silica beads dispersion liquid containing silica beads of 1.5 μm was applied by means of a spinner and was dried. Then, a substrate bonding adhesive was printed and dried. A pair of the thus-obtained structures were bonded together such that the directions of the rubbing of upper and lower orientation layers are opposite but parallel to each other, whereby a cell was formed so as to provide a thin space of about 1.3 μm for the liquid crystal.

A dopant expressed by the following formula was added at a weight ratio of 0.5 to 1% to a ferroelectric liquid crystal material having a spontaneous polarization of about 5 pC/cm². and was heated at 90° C. to realize an isotropic state. This liquid crystal was then charged into the above-mentioned space in the cell, whereby a cell embodying the present invention was obtained.

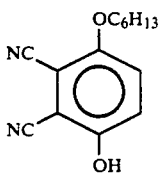

The ITO electrode portions on both sides of the cell were arranged to cross, with an overlap area of 2 mm square (0.04 cm$^2$) at each crossing.

A description will be given of a method of measuring the time constant (capacitance, resistance) of the thus-formed cell, as well as of the results of measurement.

1. Result of Measurement by an Impedance Analyzer

The cell was subjected to an impedance measurement conducted by an impedance analyzer (an impedance analyzing system produced by NF Circuit Block Company Ltd.). The overall resistance of the cell was on the order of 1 M$\Omega$ to several hundreds of M$\Omega$ when measured at a frequency of 0.1 Hz to 100 Hz. For example, a cell formed by mixing several wt % of conductive micro-particles in the polymer and adding 0.5 % of dopant to the liquid crystal showed a resistance ranging between 1 M$\Omega$ and 50 M$\Omega$.

According to a call-call plot method, discrete impedances, which are considered to be those of the orientation layer and the liquid crystal layer, were often observed.

The overall capacitance of the cell was 0.15 nF to 0.2 nF. Judging from the thickness of the respective layers in the cell, the capacitances $C_{LC}$ and $C_A$ are respectively considered to be not greater than 0.2 nF and not greater than 2 nF.

Consequently, the time constant $C_{LC}R_{LC}$ is roughly calculated as 0.2 msec to 10 msec. It is also predicted that the time constant $C_AR_A$ substantially ranges between 2 msec and 100 msec.

A more practical description will now be given as to how the liquid crystal optical device of the present invention is obtained.

According to the invention, particularly when the orientation layers are employed, the required condition is either to determine the time constant of the whole cell to be smaller than the aforementioned period $t_{reset}$ or to satisfy the condition of $C_{LC}R_{LC} \leqq t_{reset} \leqq C_AR_A < t_{field}$, between the time constant $C_{LC}R_{LC}$ of the liquid crystal layer in the cell and the time constant $C_AR_A$ of the orientation layer. When the time constant of the whole liquid crystal is smaller than the period $t_{reset}$, there is no problem because a detection voltage 2 shown in FIG. 4 is obtained by the detection circuit 2 shown in FIG. 2. When the condition of $C_{LC}R_{LC} \leqq t_{reset} \leqq C_AR_A < t_{field}$ is obtained, the liquid crystal optical device is obtainable as follows.

Figure 7:
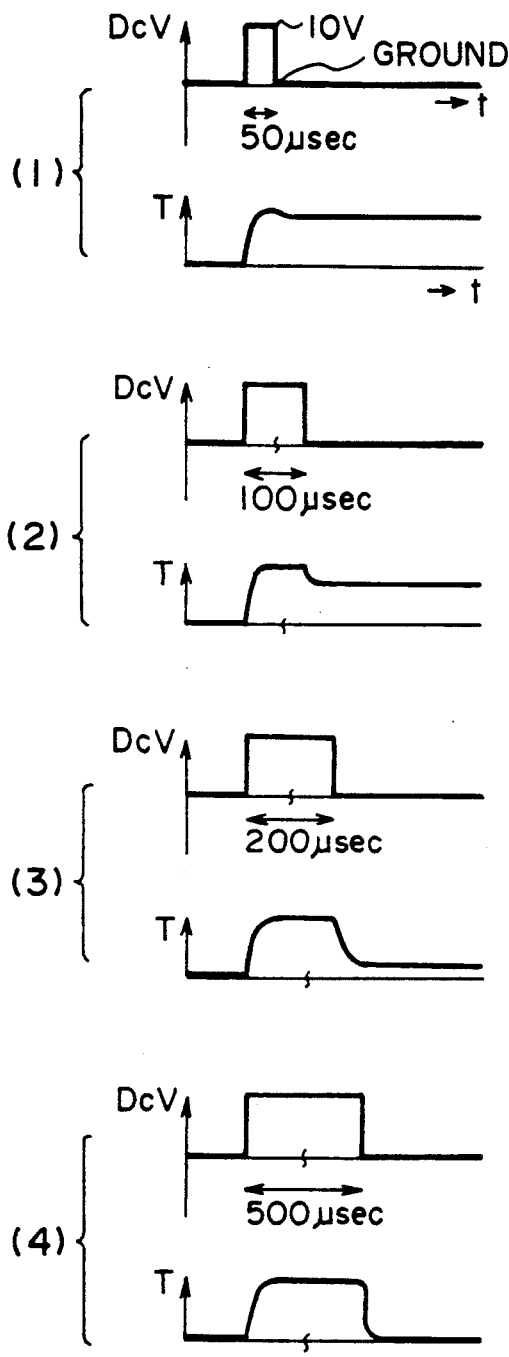
FIG. 7 is a schematic illustration of a change in the optical response of a ferroelectric liquid crystal in response to application of step voltage.

FIG. 7 shows the condition of $C_{LC}R_{LC} < C_AR_A$. More specifically, this Figure shows the result of measurement of optical response of the ferroelectric liquid crystal as observed when a substantially DC step voltage is applied across the cell.

Figure 8:
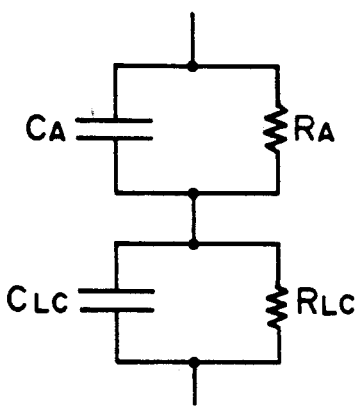
FIG. 8 is an illustration of equivalent circuit.

Referring to FIG. 8 showing an equivalent circuit, when a DC voltage of plus polarity is applied while the above-mentioned condition of $C_{LC}R_{LC} < C_AR_A$ is met, charges of a polarity which is minus with respect to that attained immediately after the application of the DC voltage, should be injected into the region between the upper side of the liquid crystal layer and the orientation layer, in accordance with the time constants $C_{LC}R_{LC}$ and $C_AR_A$. The longer the period of application of the plus voltage, the greater the amount of injection of the minus charges. Therefore, during subsequent stepped grounding, a minus electric field (electric field which tends to change the state of liquid crystal into black) is applied to the liquid crystal in accordance with the period of application of the DC voltage. Consequently, the state of the liquid crystal approaches "black" as the time of application of the DC voltage becomes long, as will be seen from (1) to (4) of FIG. 7 showing changes in the transparency.

The periods of application of the stepped voltage shown in FIG. 7 are only illustrative.

Figure 9:
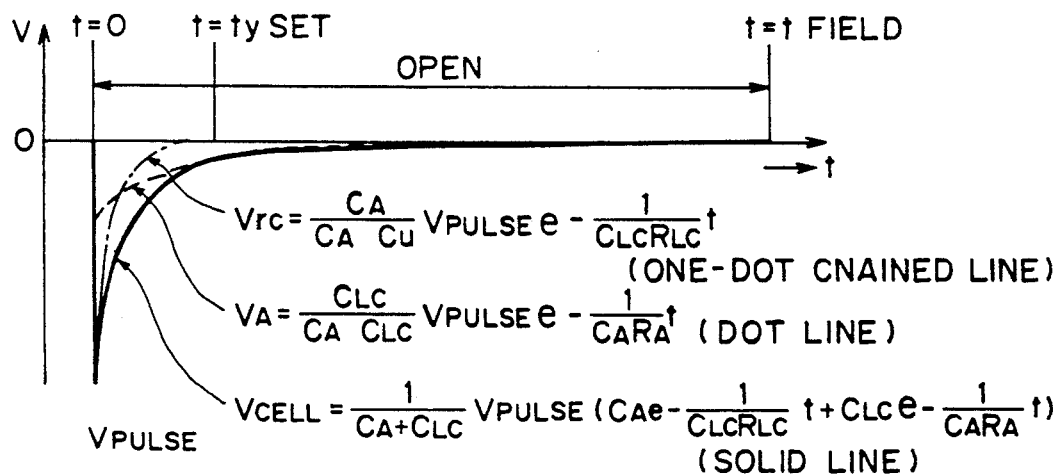
FIG. 9 is a graph showing a change in voltage in open mode driving.
Figure 9:
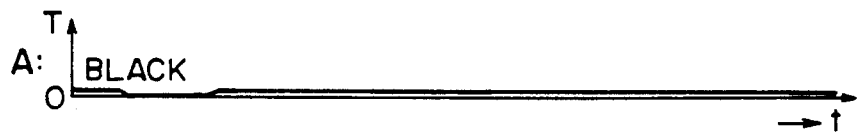
Figure 9:
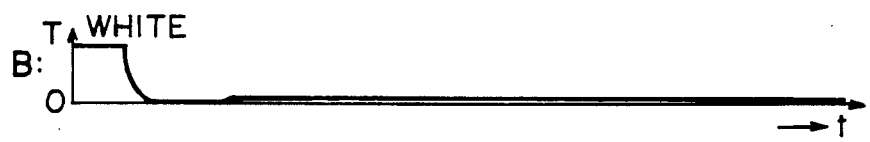

A description will now be given of the driving of the liquid crystal optical device in open mode, with reference to FIG. 9. In this case, it is assumed that the voltage is applied directly across the cell. Referring to FIG. 9, a $V_{pulse}$ is a very short pulse, e.g., 10 $\mu$sec to 20 $\mu$sec, which is applied with the external C and R removed, i.e., short-circuited, by the operation of a switching circuit shown in FIG. 2. The circuit was opened after application of this pulse. A voltage detected by a detection circuit of FIG. 2(either the circuit 1 or the circuit 2) during this operation is shown by a solid-line curve in FIG. 9. It is to be understood that the $V_{pulse}$ has a negative polarity. It is preferred to set the liquid crystal to stable "black" state before the application of the pulse $V_{pulse}$ as designated by A in the Figure, in order to avoid any influence of voltage variation which may otherwise be caused by inversion of the liquid crystal into black state due to application of the minus pulse $V_{pulse}$.

In this case, the voltage shown by the solid-line curve, appearing across the cell and detected by the detection circuit, is the sum of the divided potential of the liquid crystal and the divided potential of the orientation layer. Therefore, when the liquid crystal is in the open state, the divided potential $V_{LC}$ of the liquid crystal (shown by one-dot-and-dash line) is substantially attenuated by until the time $t = t_{reset}$ expires and, thereafter, the detected voltage is materially composed of the voltage $V_A$ of the orientation layer alone.

In the liquid crystal cell having the described construction, it is preferred that the voltage shown by the solid line is substantially completely attenuated until the time $t = t_{field}$ expires, down to a level which is about 1/100 or less, preferably 1/1000 or less the level of the pulse $V_{pulse}$.

It is also preferred that the liquid crystal used in the device of the present invention has such a time constant as to cause an attenuation down to about 1/100 or less that of the pulse $V_{pulse}$ before the expiration of the time $t = t_{reset}$. Although not exclusive, the time constant is generally determined such that the voltage shown by the solid line at the moment of $t = t_{reset}$ falls within the range of $\pm 10\%$ of the value calculated with a coefficient ($C_{LC}/(C_A + C_L)$) which is derived from the formula of $V_A$ shown in FIG. 9, by inserting the values on the solid-line curve after the moment $t = t_{reset}$.

An unduly small time constant of the liquid crystal will disable the liquid crystal to respond satisfactorily. The time constant, therefore, is preferably determined to fall within a range which enables the liquid crystal to be completely inverted from the "white" state into the"black" state in response to the reset voltage applied. For instance, when the reset pulse ($V_{pulse}$) is of 7 V, the time constant is preferably determined to be 50 $\mu$sec or longer.

According to an examination made by the present inventors, when the time constant $C_{LC}R_{LC}$ of the liquid crystal is 0.3 msec or so, the liquid crystal could be satisfactorily reset as shown in FIG. 9, within a reset period $t_{reset}$ of 1 msec, when the reset pulse voltage was 7 V.

Thus, the characteristics of the liquid crystal cell having a pixel area of 0.04 cm² were examined. Using this liquid crystal cell, a liquid crystal optical device of the invention was fabricated, employing a ceramic capacitor of $C_R = 2.2$ nF and an ordinary film resistor of $R_R = 10$ MΩ, as the external $C_R$ and $R_R$ shown in FIG. 2, so as to obtain a time constant value of $C_R R_R$ of 2 msec within the driving period $t_{field}$ of 33 msec at a driving frequency of 30 Hz. This liquid crystal optical device was subjected to a gradation driving as shown in FIG. 4. As a result, it was confirmed that unstable factors such as hysteresis and reduction in the transparency can be remarkably suppressed to ensure a high stability of gradation.

A liquid crystal optical device also was fabricated by using liquid crystal cells which were formed by the described method and which had time constants of the liquid crystal and the orientation layer of about 0.5 msec and about 5 msec, respectively, using external capacitor $C_R$ and resistor $R_R$ of 1.5 nF and 8 MΩ, respectively. This liquid crystal optical device was subjected to an open-mode driving conducted at a television rate of 60 Hz, with reset period $t_{reset}$ of 1 msec and driving period $t_{field}$ of about 17 msec. An excellent gradation driving could be performed also in this case.

A preferred embodiment of the present invention has been described. It is to be noted, however, the invention can be embodied in various other forms. For instance, it is possible to add fine particles to other types of polymers as the material of the orientation layer. In addition, it is possible to employ different methods for attaining conduction, as well as different methods of adjustment of the time constant. Furthermore, the material of the ferroelectric liquid crystal and the material and contents of the dopant can be determined with a large degree of freedom.

According to the present invention, what is necessary is that the liquid crystal cell with the ferroelectric liquid crystal charged therein exhibit a time constant falling within the above-specified range, and the time constant as measured for the orientation layer alone or the time constant as measured for the ferroelectric liquid crystal alone may be more or less deviated from the ranges set forth before.

The liquid crystal optical device of the present invention ma be devoid of the orientation layer or may have a layer different from orientation layer. In such a case, however, it is necessary that the time constant of the layer does not exceed the driving period $t_{field}$.

In order to fully enjoy the merit of the present invention, it is preferred that the condition of $C_{LC}R_{LC} < C_A R_A$ is met. This, however, is not essential and the invention can be theoretically carried out when the condition $C_A R_A \leq C_{LC}R_{LC}$ is met.

In order to realize the above-described condition $C_A R_A \leq C_{LC}R_{LC}$, it is possible to further increase the conductivity of the orientation layer from the value employed in the described embodiment. In such a case, the dielectric constant of the orientation layer is roughly calculated within the range between 2 and 20 and is typically estimated as 10. In such a case, from the condition of $C_A R_A \epsilon \epsilon_0 \rho$, the time constant determined to meet the the condition of $10 \times 8.85 \times 10^{-14}(F/cm^2) \times \rho(\Omega \cdot cm)$ $t_{reset}$. Therefore, assuming that the period $t_{reset}$ is 1 msec, for example, the conductivity $\rho(\Omega \cdot cm)$ is determined to meet the condition $\rho \leq 1 \times 10^{-3}/8.85 \times 10^{-13}$ to 1 $10^9$ ($\Omega \cdot cm$).

By determining the conductivity to meet the condition described above, is it possible to obtain an effect equivalent to that explained before in connection with FIG. 6, i.e., to eliminate any variation in the liquid crystal divided potential before the input of the next write pulse.

The above-described condition can be realized by adjusting the amount of the dopant. In such a case, the attenuation in open mode can be satisfactorily completed within the period of the reset time $t_{field}$, as shown by solid line in FIG. 9.

Figure 10:
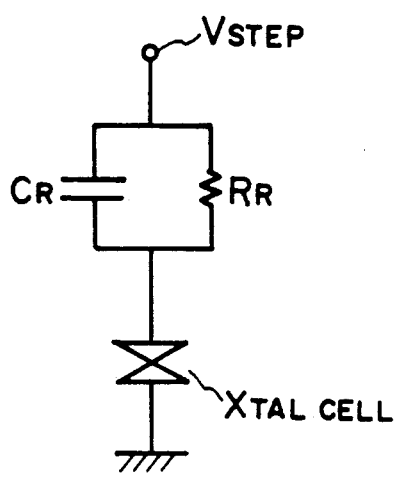
FIG. 10 is an illustration of an equivalent circuit.

When the period of application of the stepped voltage is elongated, reverse-inversion takes place undesirably as shown in FIG. 7, where the above-mentioned condition of $C_A R_A \leq C_{LC}R_{LC}$ is met. This phenomenon, however, does not occur provided that the liquid crystal has been oriented to provide bi-stability. This phenomenon, however, is often observed when the condition of the present invention is not satisfied. For instance, it is assumed here that the capacitance and the resistance of the capacitor $C_R$ and resistor $R_R$ connected in parallel to each other and in series to the liquid crystal cell are determined to be $C_R = 3,3$ nF and $R_R = 10$ MΩ, which value do not meet the requirement of the invention. In this case, the time constant is 33 msec at 30 Hz. When the device is supplied with a D.C. stepped voltage($V_{step}$) for a period exceeding 33 msec and then grounded, a reverse-inversion is observed as shown in FIG. 10.

The advantage of the present invention is particularly remarkable when applied to a device of active-matrix drive type which typically employs thin-film transistors. The capacitor $C_R$ and the resistor $R_R$ shown in FIG. 1, however, may be formed by known IC process. In particular, however, the capacitor $C_R$ is preferably formed by using a thin film having high levels of dielectric constant and insulation, such as an oxide of tantalum (Ta). The resistor $R_R$ may be formed Simultaneously With the formation of the capacitor $C_R$ with simultaneous adjustment of capacitance and resistance values by known impurity doping technique. Obviously, however, the capacitor and the resistor may be formed separately.

In another practical embodiment of the invention, the divided potential, which is materially acting on the ferroelectric liquid crystal as a result of external application of the gradation voltage, is stably applied in response to the gradation signal voltage. The second advantage is that any influence of fluctuation of the divided potential on the ferroelectric liquid crystal, which may be attributed to spontaneous polarization of the ferroelectric liquid crystal, is eliminated, while ensuring stable driving with gradation control.

Figure 18:
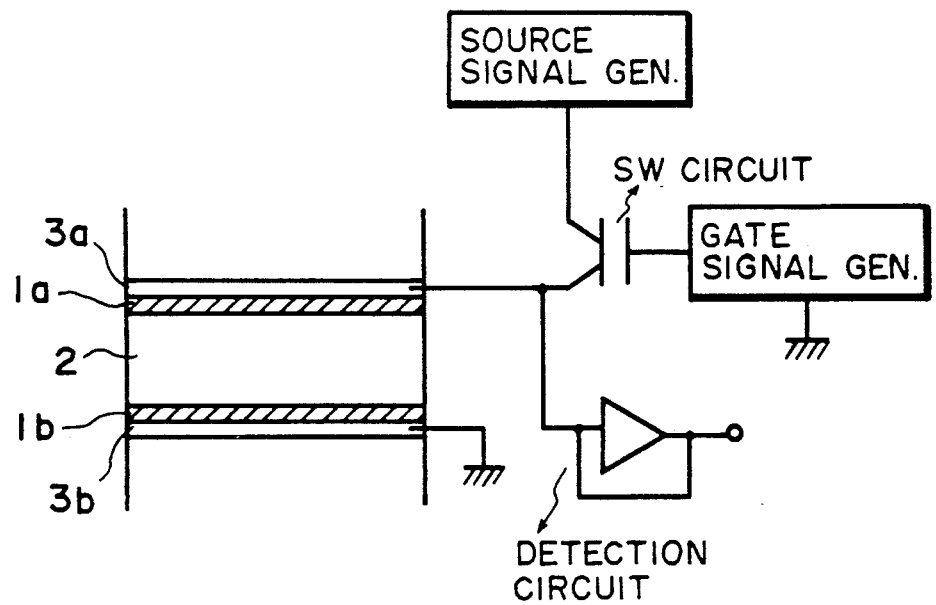
FIG. 18 is a schematic illustration of an active switching circuit.

The advantage of the device in accordance with the invention is remarkable particularly when an open-mode driving is effected by an active switching circuit such as that employing transistors, as shown in FIG. 18.

Figure 17:
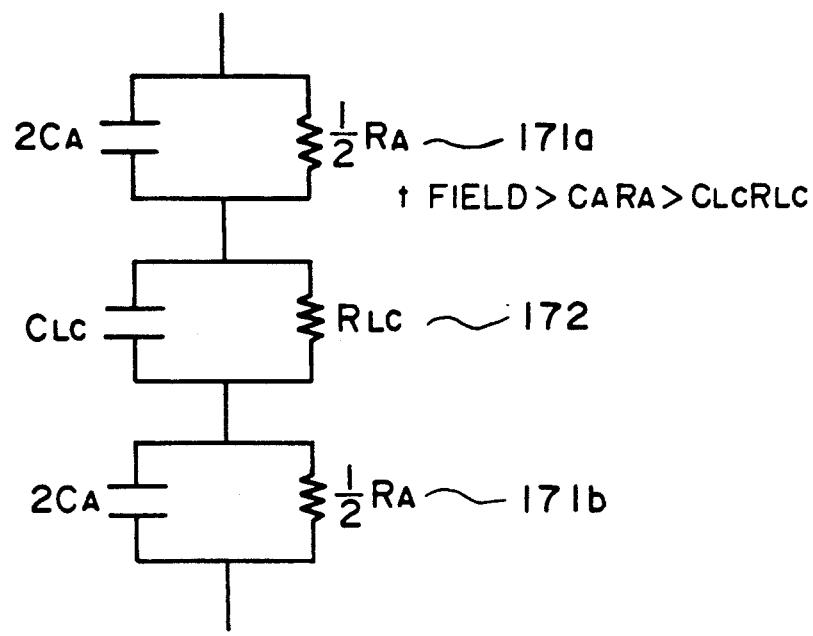
FIG. 17 is an illustration of an equivalent circuit.

The advantage described above will be explained in detail with reference to an equivalent circuit shown in FIG. 17, as well as to FIGS. 18, 19 and 4.

In an optimum form of the device in accordance with the present invention, the time constants $C_R R_R$ and $C_{LC}R_{LC}$ formed by the orientation layers 171a and 171b and the liquid crystal layer 172 are determined to meet the condition of $C_R R_R > C_{cell} R_{cell}$, thus enhancing the short-circuit prevention effect. In addition, the time constant $C_R R_R$ of the orientation layers is determined to be smaller than the field period $t_{field}$ shown in FIG. 4.

A description will now be given of an operation which is effected by a driving circuit schematically shown in FIG. 18 or a case where an operation as shown in FIG. 4 is triggered by voltage detection circuits. The above-mentioned time constant of the orientation layers is determined such that the voltage applied between the electrodes of the device is attenuated almost completely before the next reset pulse is applied.

Figure 19:
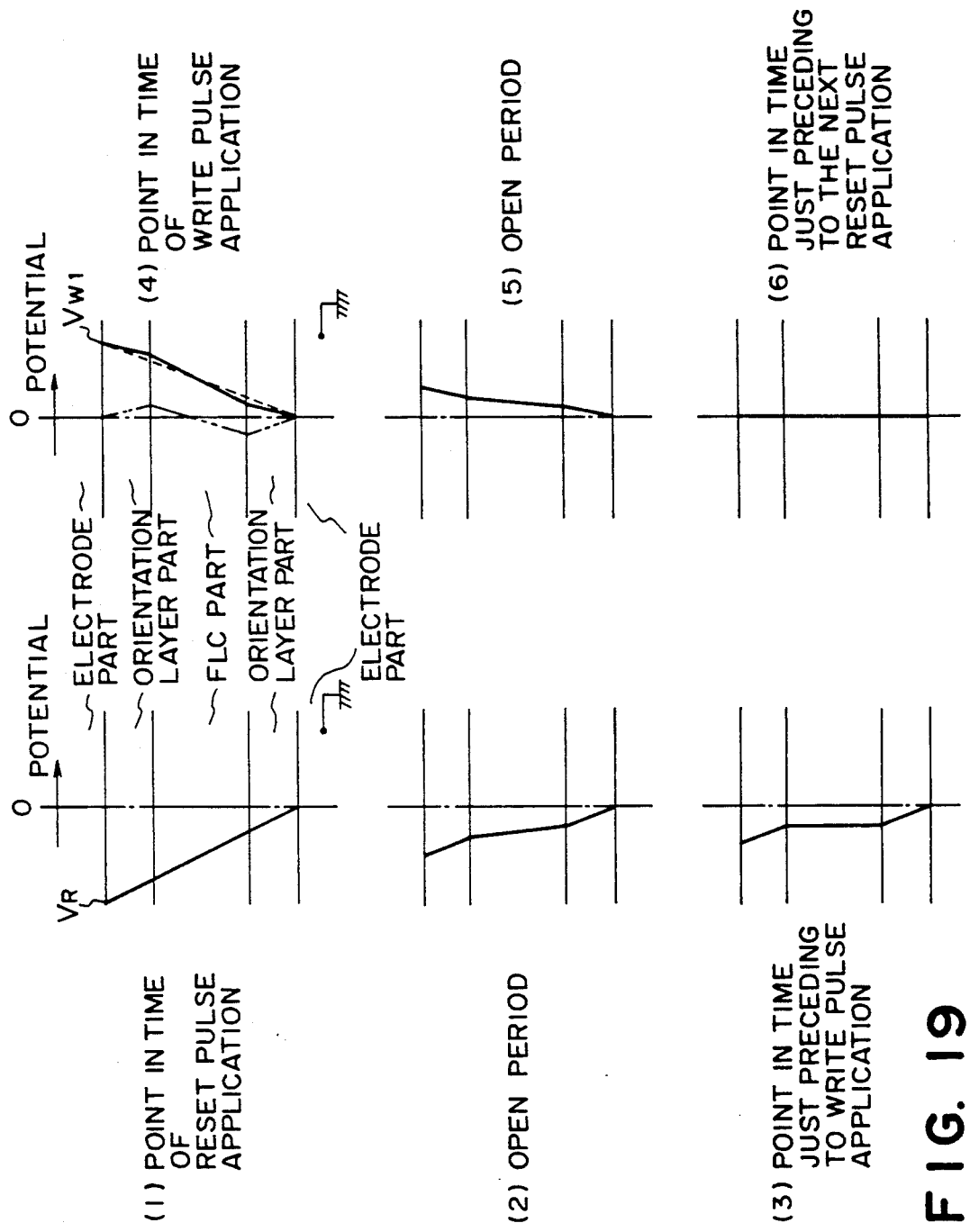
FIG. 19 is a schematic illustration of pulses applied in relation to time.

FIG. 19 shows, in terms of the potential distribution in the cell, the effect which is produced by an adjustment of the time constant of orientation layer. (1) When a reset pulse $V_R$ is applied, a linear potential state is obtained in accordance with the reset voltage. (2) Then, as the open state is established, the potentials of the orientation layer and the liquid crystal pixel cell are attenuated at their own time constants. (3) Consequently, immediately before the application of the writing pulse $V_{W1}$, a potential difference state is obtained such that the potential of the orientation layers is greater than the liquid crystal portion, due to the aforesaid condition of $C_R R_R > C_{LC} R_{LC}$, whereby a folded potential state is obtained as illustrated. (4) A write pulse is then applied. In this case, the potential difference remaining mainly in the orientation layers acts as illustrated by two-dot-and-dash line, which is superposed to the external field indicated by broken line, whereby a deflected potential state is obtained again. (5) Then, as an open state is established, the potentials are attenuated at the respective time constants. (6) According to the present invention, the condition of $C_R R_R < t_{field}$ is met as explained before, so that the whole cell is reduced substantially to zero. It is therefore possible to eliminate any hysteresis of potential for the next field, regardless of the type of the write pulse, thus suppressing the undesirable variation of the transparency, i.e., unstable operation characteristic which has been experienced with the known devices.

Furthermore, in the optical device of this embodiment, a further stabilization of gradation driving is realized, by virtue of the fact that the time constant of the cell portion is determined to be smaller than the reset period $t_{reset}$ which is shown in FIG. 4. Namely, any hysteresis or other factors affecting stability, caused by fluctuation of charges including internal ions due to spontaneous polarization, is avoided, thus attaining the second advantage described above.

According to the invention, it is possible to effect an idealistic charge control driving in open mode so that any change in the external conditions such as temperature can only cause a change which is attributable to the spontaneous polarization inherent to the ferroelectric liquid crystal or temperature dependency of the tilt angle, whereby a distinctive indication is given for selection of materials and design of the device.

Thus, the described embodiment provides a liquid crystal optical device which can be driven with good control of gradation. In addition, the liquid crystal is oriented in a good manner by virtue of the provision of the orientation layers which also serve to prevent short-circuiting between the electrodes.

Furthermore, any change in the exeternal conditions such as temperature can only cause a change which is attributable to the spontaneous polarization inherent to the ferroelectric liquid crystal or temperature dependency of the tilt angle, so that a distinctive indication is given for selecting of materials and design of the device.

The advantage of the present invention is remarkable particularly when the invention is applied to an active-matrix type device which typically employs thin-film transistors.

In order to fully enjoy the merit of the present invention, it is preferred that the condition of $C_{LC} R_{LC} \leq C_A R_A$ is met. This, however, is not essential and the invention can be theoretically carried out when the condition $C_A R_A \leq C_{LC} R_{LC}$ is met. Thus, the invention requires that the following condition is met:

$$C_{LC} R_{LC} \leq t_{reset} \leq C_A R_A < t_{field}$$

In order to realize the above-described condition $C_A R_A \leq C_{LC} R_{LC}$, it is possible to further increase the conductivity of the orientation layer from the value employed in the described embodiment. In such a case, the dielectric constant of the orientation layer is roughly calculated within the range between 2 and 20 and is typically estimated as 10. In such a case, from the condition of $C_A R_A \epsilon \epsilon 0 \rho$, the time constant determined to meet the condition of $10 \times 8.85 \times 10^{-14} (F/cm^2) \times \rho(\Omega \cdot cm)$ $t_{reset}$. Therefore, assuming that the period $t_{reset}$ is 1 msec, for example, the conductivity $\rho(\Omega \cdot cm)$ is determined to meet the condition of $\rho \leq 1 \times 10^{-3}/8.85 \times 10^{-13}$ to 1 $10^9 (\Omega \cdot cm)$.

By determining the conductivity to meet the condition described above, is it possible to obtain an effect equivalent to that explained before in connection with FIG. 16, i.e., to eliminate any variation in the liquid crystal divided potential before the input of the next write pulse.

The above-described condition of $C_{LC} R_{LC} < t_{field}$ can be realized by adjusting the amount of the dopant. In such a case, the atenuation in open mode can be satisfactorily within the period of the reset time $t_{field}$, as shown by solid line in FIG. 9.

When the period of application of the stepped voltage is elongated, reverse-inversion takes place undesirably as shown in FIG. 7, where the above-mentioned condition of $C_A R_A \leq C_{LC} R_{LC}$ is met. This phenomenon, however, does not occur provided that the liquid crystal has been oriented to provide bi-stability. This phenomenon, however, is often observed when the condition of the present invention is not satisfied. For instance, it is assumed here that the capacitance and the resistance of the capacitor $C_R$ and resistor $R_R$ connected in parallel to each other and in series to the liquid crystal cell are determined to be $C_R = 3.3$ nF and $R_R = 10$ MΩ, which value do not meet the requirement of the invention. In this case, the lime constant is 33 msec at 30 Hz. When the device is supplied with a D.C. stepped voltage($V_{step}$) for a period exceeding 33 msec and then grounded, a reverse-inversion is observed as shown in FIG. 10. The states of potentials schematically shown in (2) to (5) of FIG. 19 may differ in this case, but the states (1) and (6) are the same as those described before.

What is claimed is:

1. A liquid crystal optical device comprising:
   a liquid crystal pixel comprising: a ferroelectric liquid crystal layer held in a gap defined by a pair of electrodes, said liquid crystal pixel having a time constant and exhibiting gradation in response to an external voltage applied between said electrodes in accordance with a gradation signal; and a parallel circuit composed of a capacitance and a resistance having a time constant greater than said liquid crystal pixel time constant greater than said liquid crystal pixel time constant and less than a field period for giving a gradation change to said pixel by repeated application of the gradation signal, said parallel circuit connected in series to the gap between said electrodes.

2. A liquid crystal optical device according to claim 1, wherein said liquid crystal layer has a time constant which provides the greatest response inversion of said liquid crystal within the range of the minimum voltage required for causing an optic change in sad liquid crystal, said time constant being smaller than the period of application of the voltage.

3. A liquid crystal optical device according to claim 1, wherein said parallel circuit is connected in series between said pixel and a switching circuit of an active matrix arrangement.

4. A liquid crystal optical device according to claim 1, wherein orientation layers are formed in said gap between said electrodes.

5. A liquid crystal optical device comprising:

a liquid crystal pixel comprising: a ferroelectric liquid crystal layer held in a gap defined by a pair of electrodes, having a time constant, and, exhibiting gradation in response to an external voltage applied between said electrodes in accordance with a gradation signal; and orientation layers for orienting said liquid crystal, wherein the following condition is met:

$$C_{LC}R_{LC} \leq t_{reset} \leq C_A R_A < t_{field}$$

wherein $C_{LC}R_{LC}$ represents the time constant of said liquid crystal layer, $C_A R_A$ represents the time constant of said orientation layers, $t_{field}$ represents the period of the field for imparting a gradation change to said pixel by repeated application of the gradation signal, and $t_{reset}$ represents the shortest period of application of voltage for causing an optical change of said pixel within the range which provides the maximum response inversion of said pixel.

6. A liquid crystal optical device according to claim 5, wherein said pixel is connected to an active matrix switching element.

* * * * *

UNITED STATES PATENT AND TRADEMARK OFFICE
CERTIFICATE OF CORRECTION

PATENT NO. : 5,260,817
DATED : November 9, 1993
INVENTOR(S) : SHUZO KANEKO ET AL.

It is certified that error appears in the above-identified patent and that said Letters Patent is hereby corrected as shown below:

ON THE COVER PAGE

AT [75] INVENTORS
"Murakami Tomoko," should read --Tomoko Murakami,--.

SHEET 2 OF 11

FIG. 2, "EXTERNAR" should read --EXTERNAL--.

SHEET 5 OF 11

FIG. 6, "NORD" should read --NODE-- and
"SINDE" should read --SIDE--.

COLUMN 1

Line 26, "displays" should read --display--.
Line 28, "Proceeding" should read --Proceedings--.
Line 49, "electrode." should read --electrodes.--.

COLUMN 2

Line 55, "the the" should read --that the--.
Line 61, "make" should read --makes--.

COLUMN 3

Line 12, "(+:142a; 142b)" should read --(+:142a;-:142b)--.
Line 60, "maybe" should read --may be--.

UNITED STATES PATENT AND TRADEMARK OFFICE
CERTIFICATE OF CORRECTION

PATENT NO. : 5,260,817
DATED : November 9, 1993
INVENTOR(S) : SHUZO KANEKO ET AL.         Page 2 of 3

It is certified that error appears in the above-identified patent and that said Letters Patent is hereby corrected as shown below:

COLUMN 5

Line 13, "$VW_1,,$" should read --$VW_1,$--.
Line 37, "Orientation" should read --orientation--.

COLUMN 8

Line 56, "$(C_{Lc}/(C_A+C_L))$" should read --$C_{Lc}/(C_A+C_L)$--.

COLUMN 9

Line 52, "ma" should read --may--.

COLUMN 10

Line 41, "dieleo-" should read --dielec- --.
Line 43, "Simultaneously" should read --simultaneously--.
Line 44, "With" should read --with--.

COLUMN 12

Line 39, "atenuation" should read --attention--.
Line 40, "within" should read --completed within--.
Line 54, "value" should read --values--.

UNITED STATES PATENT AND TRADEMARK OFFICE
CERTIFICATE OF CORRECTION

PATENT NO. : 5,260,817
DATED : November 9, 1993
INVENTOR(S) : SHUZO KANEKO ET AL.          Page 3 of 3

It is certified that error appears in the above-identified patent and that said Letters Patent is hereby corrected as shown below:

COLUMN 13

Line 16, "sad" should read --said--.

Signed and Sealed this

Tenth Day of May, 1994

Attest:

BRUCE LEHMAN

Attesting Officer        Commissioner of Patents and Trademarks